UNITED STATES PATENT OFFICE.

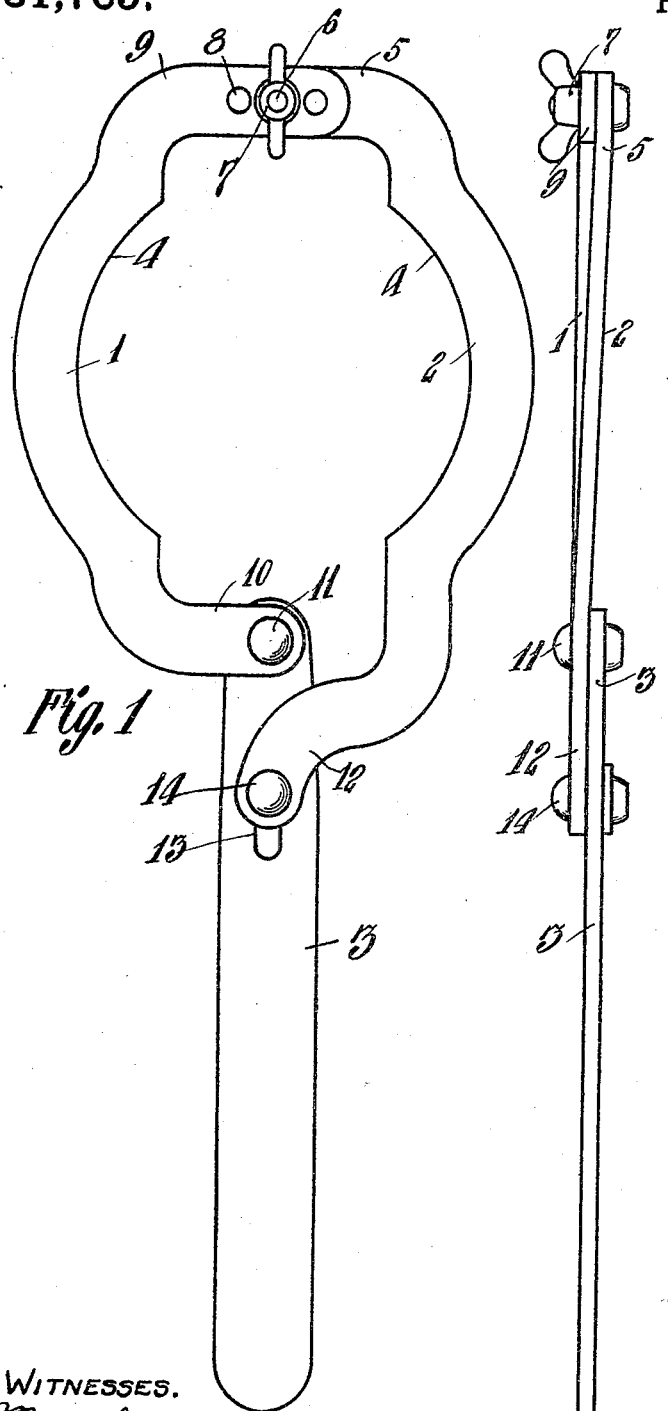

NORMAN J. KECK AND ROGER E. LEWIS, OF LOCKPORT, NEW YORK.

JAR-WRENCH.

931,765.  Specification of Letters Patent.  Patented Aug. 24, 1909.

Application filed April 1, 1909. Serial No. 487,315.

*To all whom it may concern:*

Be it known that we, NORMAN J. KECK and ROGER E. LEWIS, citizens of the United States, residing at Lockport, in the county of Niagara and State of New York, have invented certain new and useful Improvements in Jar-Wrenches, of which the following is a specification, reference being had to the accompanying drawings.

This invention relates to improvements in grips or wrenches for removing tops from fruit jars.

The object of the invention is to improve and simplify the construction of devices of this character and thereby render the same less expensive and to provide one which will effectively adapt itself to the jar top so as to secure an effective purchase and to provide one which may be varied in size for use upon different sized jar tops.

With the above and other objects in view, the invention consists of the novel features of construction and the combination and arrangement of parts hereinafter fully described and claimed, and illustrated in the accompanying drawings, in which—

Figure 1 is a plan view of the improved jar wrench; and Fig. 2 is an edge view of the same.

The invention consists of two opposing jaws 1, 2 and a handle 3, the jaws having their outer ends pivotally and adjustably united and their inner ends connected to the handle 3, whereby the latter will serve also as a lever for drawing the jaws together and upon the screw top of a Mason fruit jar or any similar object on which the invention is used. As illustrated, the jaws 1, 2 are in the form of flat metal straps having the inner edges of their intermediate portions concaved to provide opposing curved gripping edges 4 and their outer ends are offset or bent at right angles and arranged to overlap. Said outer end 5 of the jaw 2 has an opening to receive a pivot 6 in the form of a removable bolt having on its threaded end a wing nut 7.

The pivot bolt 6 is adapted to be passed through any one of a longitudinal series of openings 8 formed in the bent outer end 9 of the other jaw 1, whereby the two jaws are both pivotally and adjustably united, the adjustment of the pivotal connection permitting said jaws to be positioned closer to or farther from each other to adapt them to receive jar tops of different sizes. The inner end of the jaw 1 is similarly offset or bent at right angles, as shown at 10, and it is pivoted by means of a rivet or the like 11 to one end of the handle 3, which latter is also in the form of a flat metal strap. The inner end of the other jaw 2 is offset and bent to provide a curved extremity 12 which has a loose sliding and pivotal connection with the handle 3 at a point in rear of the pivot 11. Said connection is preferably formed by providing in the handle 3 a longitudinal slot 13 to receive a rivet or other pivot 14 carried by the end 12 of the jaw 2. This slot and pin connection between the jaw 2 and the handle, together with the arrangement of the pivots 6, 11, enables the gripping edges 4 of the two jaws to effectively adapt themselves to and secure an effective grip upon the top of a jar, when the outer or hand grip end of the handle is swung to the left, as will be readily understood upon reference to Fig. 1. It will be noted that when the device is turned over or reversed and the jaw 1 is engaged with the right hand side of the top of the jar, when the hand grip end of the lever is swung to the right the jaws will act in a similar manner and grip the top of the jar so that said top can be unscrewed. The slot and pin connection between the jaw 2 and the handle permits said jaws to operate upon jars of different sizes within certain limits, without adjusting the pivot 6, but by means of said adjustable pivot 6, the jaws may be positioned farther from or closer to each other so that the wrench may be effectively used upon jars of the largest and smallest sizes now in common use.

From the foregoing it will be seen that the invention is exceedingly simple in construction and may therefore be produced at a small cost and will be strong and durable in use; that, owing to the peculiar connection between the parts, it will effectively grip the jar or can top; and that, owing to its adjustment it may be readily adapted for use on jar tops and other objects of various sizes.

Having thus described the invention what is claimed is:

The hereindescribed jar wrench comprising a pair of jaws, each formed from a piece of flat metal and having its intermediate portion curved longitudinally to provide a gripping face and its ends offset and of right angular shape, the outer end of one jaw being formed with a longitudinal series of openings, an adjusting bolt arranged upon the outer end of the other jaw and adapted to be inserted in any one of said openings to adjustably pivot said jaws, a lever consisting of a flat metal handle formed adjacent its outer end with a longitudinal slot, a pivot uniting the inner end of the first mentioned jaw to the outer end of said lever, the inner end of the other jaw being formed with a rearwardly projecting extension and a pivot carried by said extension and slidably arranged in said slot of the hand lever.

In testimony whereof we hereunto affix our signatures in the presence of two witnesses.

NORMAN J. KECK.
ROGER E. LEWIS.

Witnesses:
  ROY H. ERNEST,
  CHAS. P. DUNN.